March 6, 1956     H. B. VAN DORN ET AL     2,737,057
GEAR-TOOTH CONSTRUCTION
Filed Jan. 17, 1952
FIG. 1.
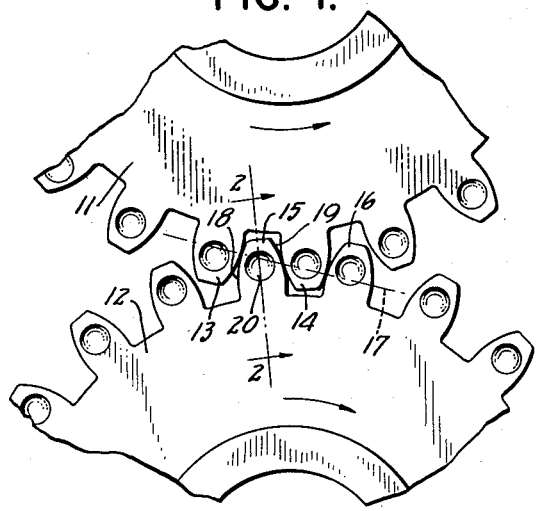
FIG. 2.
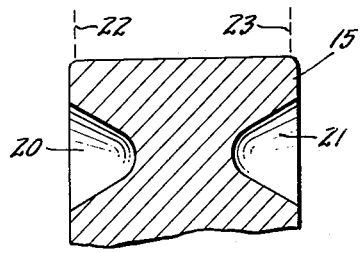
FIG. 5.
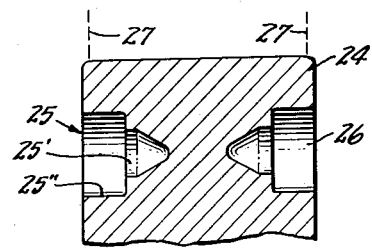
FIG. 3.
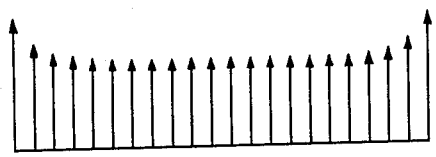
FIG. 6.
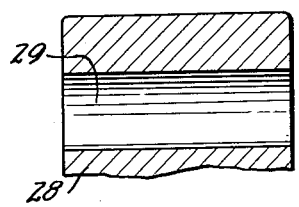
FIG. 4.
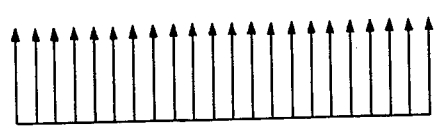
FIG. 7.    FIG. 8.    FIG. 9.    FIG. 10.
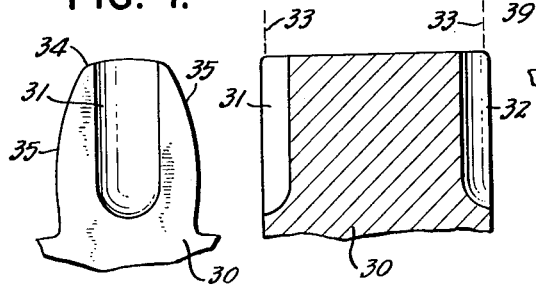
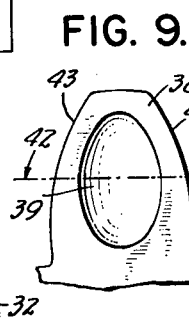
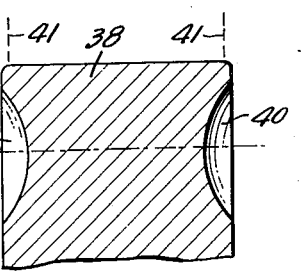
INVENTOR.
HORACE B. VAN DORN
RONALD W. MORAN
BY Mitchell & Bechert
ATTORNEYS

United States Patent Office 2,737,057
Patented Mar. 6, 1956

2,737,057

GEAR-TOOTH CONSTRUCTION

Horace B. Van Dorn and Ronald W. Moran, New Britain, Conn., assignors to The Fafnir Bearing Company, New Britain, Conn., a corporation of Connecticut Application January 17, 1952, Serial No. 266,922

11 Claims. (Cl. 74—460)

Our invention relates to an improved construction for relatively rolling elements, such as gear teeth. The present disclosure incorporates features of our co-pending patent application Serial No. 262,989, filed December 22, 1951, which is specifically directed to rollers, raceways, and cam constructions.

In gear teeth of conventional construction, the rolling or working surfaces are generally designed to make essentially line contacts with the teeth with which they mesh. Under load conditions mechanical wear is found to occur at the finite (lateral) ends of the tooth. This effect, known as "end-effect," may be attributed to metal at the center of the contact area being supported by adjacent metal which is also in compression, while metal at the ends or at what may be termed the "terminal planes" of the teeth does not have the advantage of balanced hydrostatic support from adjacent metal. This unbalance causes elevated stress concentrations at the extremities or end zones of the teeth; this elevated end stress becomes the design working maximum, a factor limiting the capacity of the gears. The material in these end zones exhibits early fatigue, and the ends of the working surfaces, whether on the driving tooth or on the driven tooth, may flake and erode prematurely. These abnormal tendencies toward early breakdown of the teeth may be accelerated by inadvertent initial misalignment of the gears, or by misalignment produced by shaft deflections under heavy loads. Since the fatigue life of a gear is inversely proportional to a power of the load, or inversely proportional to an even higher power of the stress, it is clearly seen how sensitive the fatigue life is to end-stress conditions.

The above-noted end effect has long plagued the gear designer, and efforts have been made to avoid the effect by special contouring or "crowning" of the gear surfaces. In ordinary applications, such contouring may amount to the removal of only a matter of a few thousandths or less of an inch, but this represents a fussy operation on special machinery.

It will be appreciated, for purposes of the present discussion, that the end of a gear tooth is essentially that part of the tooth at which it may be said to provide (or to be provided with) supporting material normal to the load. Some teeth are constructed with rounded or heavily chamfered ends so that the ends of these teeth may, in reality, be the inner edge of the chamfer; thus, it will be understood throughout the present discussion that the term "tooth end" applies to the so-called "terminal plane"— that is, to the extreme sectional plane in which the tooth may be said to provide or to be provided with direct support.

It is, accordingly, an object of the invention to provide an improved tooth construction of the character indicated.

It is another object of the invention to provide an improved tooth construction which may result in substantially prolonging the life of a particular gear, and of a gear in mesh therewith.

Another object is to provide a gear-tooth construction in which the transverse distribution of stress may be substantially uniform, even at the terminal planes of the teeth; conversely, it is an object to provide a gear-tooth construction in which sharp transitions in the transverse distribution of stress may be substantially reduced.

It is also an object to provide a gear-tooth construction in which end stress is not a substantial factor limiting the capacity; stated in other words, it is an object to gain added effective tooth width for any given set of space limitations.

A further object is to provide an improved gear-tooth construction which may exhibit high-load capacity for given space limitations, which may carry a given load for a substantially longer period of time, and which may carry a substantially greater load for a given period of time.

It is a specific object to provide a tooth construction meeting the above objects, without requiring great changes in conventional finishing processes of gear teeth and without requiring special additional processes of high accuracy.

Another specific object is to provide a gear-tooth construction which may accomplish the beneficial results of "crowning" without the disadvantage of partial contact under light load; in other words, it is an object to meet all the above objects with a construction which will involve full-width contact at all times.

Other objects and various features of the invention will be pointed out or will occur to those skilled in the art from a reading of the following specification, in conjunction with the accompanying drawings. In said drawings, which show, for illustrative purposes only, preferred forms of the invention:

Fig. 1 is a fragmentary end view illustrating meshing gears incorporating features of the invention;

Fig. 2 is an enlarged fragmentary sectional view, taken in the plane 2—2 of Fig. 1;

Figs. 3 and 4 are load diagrams, respectively illustrating the transverse distribution of stress for gear teeth of conventional construction and for the teeth of Fig. 1;

Figs. 5 and 6 are views similar to Fig. 2, illustrating modifications;

Figs. 7 and 8 are fragmentary left-end and transverse-sectional views of a further modified gear-tooth construction; and Figs. 9 and 10 are left-end and transverse-sectional views of still another gear-tooth construction.

Our invention contemplates principal application to gear teeth without involving any change in the normal or conventional contouring of the working faces. The invention thus contemplates tooth contact essentially in the nature of a line contact, and this contact may be said to exist between terminal planes. The transverse distance between these terminal planes (i. e., effective width of the gear) may be determined by the gear having the lesser structural width.

Briefly stated, our invention consists of so excavating the end or lateral faces of the gear teeth of one or both of two meshing gears that a certain substantial end part of the teeth of either or both gears is rendered variably flexible, permitting deflections within the elastic limit of the material, so that severe stress concentrations or levels cannot occur at terminal planes. A number of applications of this principle will be shown and described; it will be understood that, although, for simplicity, the actual teeth shown are for spur gears, the invention is equally applicable to helical, beveled, and other tooth configurations.

In Figs. 1 and 2, we show the invention in application to two meshing gears 11—12. The gear 11 may be driving the gear 12 in the sense indicated by directional arrows on the drawing; at the instant depicted, the thrust-load will be shared by the teeth 13—14 of gear 11, driving teeth 15—16 of gear 12, the thrust being directed generally along the line 17. Each tooth may, like the tooth 15, be formed with working faces 18—19 of conventional contour, that is, the faces 18—19 may be shaped for essentially line contact (for the width between terminal planes) with the corresponding faces of teeth of the gear 11 meshing therewith.

As explained above, our invention consists in so excavating the ends of the teeth that the end sections are rendered variably flexible. In Fig. 2, this effect is achieved by forming both ends of the tooth 15 with recesses 20—21 of outwardly flaring shape; in each case, the excavation extends well within the terminal planes 22—23.

The stress relief achieved when using teeth as shown in Figs. 1 and 2, under a normal load, is demonstrated by the stress diagrams of Figs. 3 and 4; both diagrams depict load distribution for teeth of the same dimensions and subjected to the same load. Fig. 3 represents the case of a conventional tooth in which no provision is made for stress relief at the terminal planes, that is, in which the working surface is contoured to mate with the corresponding surface of another tooth for the full transverse extent of the span between terminal planes, and in which the tooth ends are solid and are not excavated. It will be seen that, due to the lack of flexibility at the ends, extreme stress concentrations occur at the ends, that is, at the terminal planes. These stress concentrations limit the capacity or become the source of early fatigue or failure of conventional gear teeth. On the other hand, a tooth excavated as described in Figs. 1 and 2 may, while sustaining the same load as that discussed in connection with Fig. 3, exhibit substantially uniform stress distribution along the line of contact between meshing teeth, as shown in Fig. 4. Of course, if the load is to be uniformly sustained for the full span between terminal planes, in the manner shown in Fig. 4, then the extent of the excavations 20—21, that is, the manner in which the load-supporting section is reduced upon approach to the terminal planes, will vary depending upon the size of the tooth and the size of the load, and upon whether the meshing gear teeth are similarly treated. Generally speaking, however, the excavation will be considerable and transversely inwardly of the terminal planes.

In Figs. 5 and 6, we show two modifications of the gear-tooth construction of Fig. 2. In Fig. 5, the tooth 24 is again excavated at both ends at recesses 25—26, and these recesses extend inwardly of the terminal plane 27. The recesses 25—26 are perhaps more simply made by means of a drill operation to produce the bore 25', and a boring operation to produce the counterbore 25''. In Fig. 6, the tooth 28 is bored from end to end, to provide a single recess or opening 29.

Figs. 7 and 8 illustrate a further embodiment as applied to tooth 30. The excavation of tooth 30 is made at 31—32 substantially inwardly of the terminal planes 33, but this excavation extends substantially from the root to the outer limit or top of the tooth, so that the outer limit is also rendered variably flexible. The excavations 31—32 may be formed in a simple indexed radially outward milling operation, prior to heat-treating or other finishing operations on the working surfaces 35.

In Figs. 9 and 10, still another modification is shown, wherein both ends of the gear tooth 38 are excavated at 39—40 substantially inwardly of the terminal planes 41. The excavations at 39—40 are of generally oval section and flare outwardly, and are located between the root and the top of the tooth. We prefer that in the vicinity of the pitch line or pitch diameter, as indicated at 42, the sectional contour of the excavations shall substantially conform with the adjacent contour of the working surfaces 43—44 of the tooth, as shown.

It will be seen that we have disclosed improved gear-tooth constructions, permitting the more uniform transverse distribution of load on each tooth. All forms of the invention avoid the extreme stress levels which under load can cause great damage in conventional constructions. By avoiding this principal source of wear, we have actually disclosed a means whereby maximum effective tooth contact can be retained in service at all times, regardless of the size of the load, so that gear life may be prolonged and load capacity may be increased in any given gear size or type. Of particular importance, our invention is adaptable to gears without requiring any change in the customary grinding and other finishing operations for like-size conventional components.

While we have shown the invention in detail for the preferred forms shown, it will be understood that modifications may be made within the scope of the invention as defined in the following claims.

We claim:

1. A gear construction comprising a plurality of spaced teeth, each tooth including opposed working faces extending transversely to a terminal plane, said tooth being recessed between said faces and within the section limited by the root and the top of the tooth, the body of each tooth between the bottoms of the respective end recesses thereof being solid throughout.

2. A gear construction, comprising a body with laterally spaced end faces and a plurality of spaced teeth between said faces, said teeth comprising opposed working faces extending to terminal planes near each said end face, and said teeth being recessed between said faces and at both end faces to a depth passing through said terminal planes, the substantial body of each tooth lying between the bottoms of the respective end recesses thereof.

3. A gear construction, comprising a body with laterally spaced end faces and a plurality of spaced teeth between said faces, said teeth comprising opposed working faces extending to terminal planes near each said end face, and said teeth having recesses between said faces and at both end faces, said recesses being of a depth which passes through said terminal planes, said recesses being of limited extent from both said end faces and being flared outwardly.

4. A construction according to claim 2, in which the curvature of said recesses, in a cross-section including both said working faces, conforms generally with the curvature of the adjacent working face substantially at the pitch line thereof.

5. A gear construction, comprising a body with spaced lateral faces, and a plurality of spaced teeth, each tooth including opposed working faces extending transversely between said lateral faces, each of said lateral faces being recessed intermediate said working faces for a substantial inward distance, the central body of said tooth between said recesses being solid throughout, each such recess being slight enough to maintain normal operating contact between the teeth of said gear and the teeth of a meshing gear, and at the same time extensive enough to permit a limiting of the stress from the unexcavated section of the tooth to the terminal planes thereof, whereby the teeth may assume abnormal loads without typical tooth-end failures.

6. A gear construction, comprising a body with spaced lateral faces and a plurality of spaced teeth, each tooth including opposed working faces extending transversely between said lateral faces, each of said lateral faces being recessed intermediate said working faces for a substantial inward distance and short of the central section of said body, said central section being solid to provide relatively unyielding support of a load, each such recess being slight enough ot maintain normal operating contact between the teeth of said gear and the teeth of a meshing gear and at the same time extensive enough to permit limitation of stress to substantially no more than the stress at the unexcavated part.

7. A gear construction according to claim 6, in which said recesses have a circular section.

8. A gear construction according to claim 6, in which said recesses are of a generally oval section.

9. A gear construction according to claim 6, in which the pitch line of said teeth at said lateral faces passes through said recesses.

10. A gear construction, comprising a body with spaced lateral faces, and a plurality of spaced teeth, each tooth including opposed working faces extending transversely between said lateral faces, each of said lateral faces being recessed intermediate said working faces for a substantial inward distance, the substantial sections of said recesses occurring outwardly of the central section of said body, the central section of said body being solid between the bottoms of the end recesses for each tooth, each such recess being slight enough to maintain normal operating contact between the teeth of said gear and the teeth of a meshing gear, and at the same time extensive enough to permit deflections of the excavated sections of the tooth within the elastic limit of the material of the tooth, whereby the teeth may assume abnormal loads without typical tooth-end failures.

11. A gear construction, comprising a plurality of spaced teeth terminating at opposed lateral faces, each said tooth including two working faces oppositely inclined on opposite sides thereof and extending transversely substantially to said lateral faces, each said lateral face being recessed intermediate said working faces, the central substantial body of said tooth between said recesses being solid throughout, whereby said recesses may relieve otherwise excessive end-effect stress concentrations.

References Cited in the file of this patent

UNITED STATES PATENTS

| | | |
|---|---|---|
| 1,751,634 | Holmes | Mar. 25, 1930 |
| 2,335,504 | Gazda | Nov. 30, 1940 |